D. PARKS.
FEEDING MECHANISM FOR COTTON CLEANING MACHINES.
APPLICATION FILED JULY 19, 1912.
1,081,461.
Patented Dec. 16, 1913.
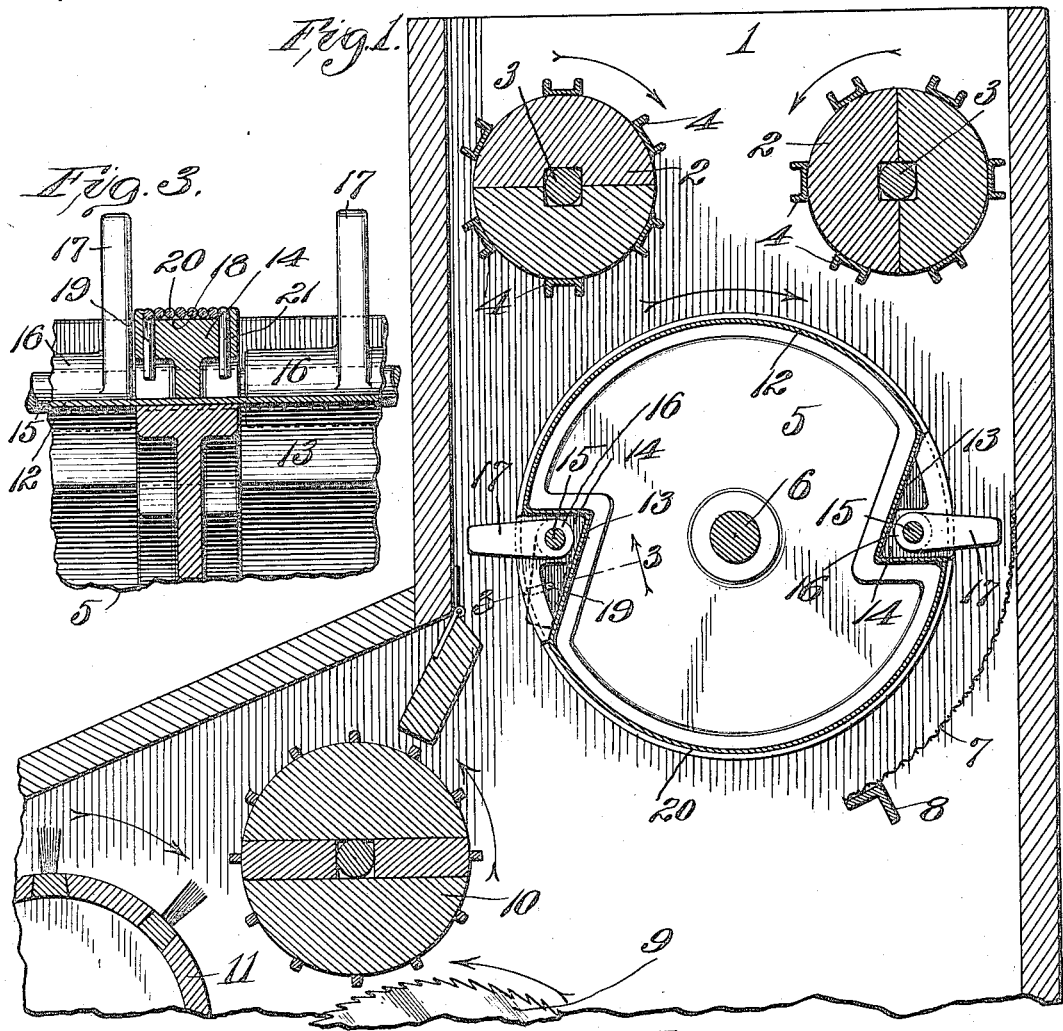
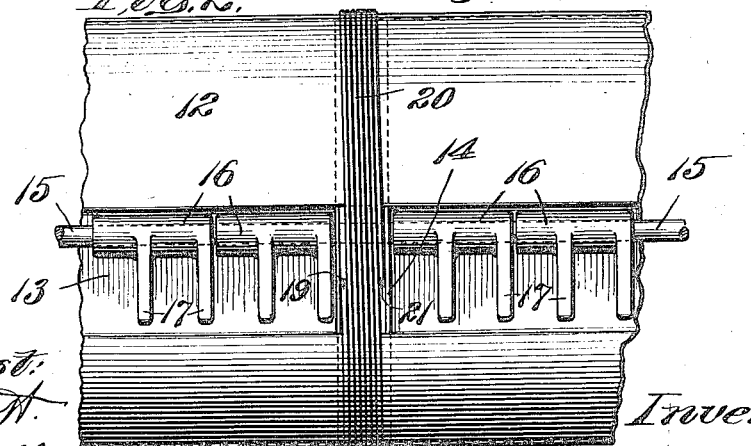
Inventor:
Dennis Parks,
by Bruce S. Elliott, Atty.
Attest:
Wm. H. Scott.
Stella Hill.

UNITED STATES PATENT OFFICE.

DENNIS PARKS, OF ST. LOUIS, MISSOURI.

FEEDING MECHANISM FOR COTTON-CLEANING MACHINES.

1,081,461.

Specification of Letters Patent.

Patented Dec. 16, 1913.

Application filed July 19, 1912. Serial No. 710,391.

*To all whom it may concern:*

Be it known that I, DENNIS PARKS, a citizen of the United States, residing in the city of St. Louis and State of Missouri, have invented new and useful Improvements in Feeding Mechanism for Cotton - Cleaning Machines, of which the following is a specification.

This invention relates to certain new and useful improvements in cotton cleaning machines of the type illustrated in the allowed application of John E. Mitchell, Ser. No. 661,099, filed November 18th, 1911, and relates particularly to improvements in the feeding mechanism. In order for machines of this type to work satisfactorily, it is necessary that the feed of the cotton into the machine. should be controlled and that the cotton so fed into the machine be in turn acted upon in such manner that regulated amounts thereof shall pass to the saw cylinder in the proper condition to be acted upon by the saws. To this end the feeding mechanism must comprise means for delivering the cotton to the saws and at the same time disintegrating the cotton and crushing the bolls so as to facilitate the ready engagement of the cotton by the saws, and the like ready separation and removal of the hulls from the cotton.

In the Mitchell machine above referred to, the device which acts to crush the bolls and to controllably discharge the cotton upon the saw cylinder, is in the form of a cylinder rotatably mounted in juxtaposition to a screen and provided around its circumference with longitudinally-extending fixed blades. While this device acts in a satisfactory manner under ordinary conditions, it was soon found that when, as often occurs, a stone or other hard substance entered the machine along with the cotton, the blades of the cylinder would be broken by contact therewith, and the machine thereby rendered inoperative or, at least, incapable of satisfactory operation. To overcome this objection I have devised, as part of the feed mechanism, a cylinder similarly located with respect to feed rolls as in the said Mitchell device, but instead of fixed blades the feed cylinder is provided with a series of pivotally-mounted arms, which can readily yield under contact with a hard substance, and thereby prevent breaking of the arms, and allowing the rotation of the cylinder to continue. Not only so, but the repeated blows of these arms upon such substance will invariably break or disintegrate it and facilitate its removal from the machine, and, of course, these pivotal arms will act with equal facility to crush the bolls and large pieces of hull passing into the machine with the cotton.

My improved feeding mechanism, as a whole, therefore, comprises two revolving feed rolls moving toward each other, and located centrally below the same a revolving cylinder provided around its circumference with longitudinal series of pivoted arms. In practice I find that two rows of pivoted arms located, respectively, on opposite sides of the cylinder are sufficient, although, of course, three or more of such rows of arms can be employed if found desirable.

In addition to the feed mechanism generally, the invention likewise comprehends certain details of construction, all of which will be fully set forth hereinafter.

In the accompanying drawing—Figure 1 is a broken cross sectional view of the upper part of a cotton cleaning machine of the type above referred to; Fig. 2 is a plan view of a portion of the combined crushing and feeding cylinder; and Fig. 3 is a broken sectional view taken on the line 3—3 of Fig. 1.

Referring now to the drawing, 1 indicates the casing of the machine and 2 a pair of feed rolls mounted on shafts 3 and revolving toward each other, as indicated by the arrows. Each of these rolls is provided around its circumference with longitudinally-extending channeled bars 4, which bars form gripping surfaces to engage the cotton and force it downward into the machine.

The numeral 5 indicates the combined feeding and crushing cylinder which is mounted on a shaft 6 and revolves in the direction indicated by the arrow. Partially surrounding the lower side of this cylinder is a screen 7 secured at its lower end to an angle iron 8 and at its upper end to the casing in any suitable manner.

The numeral 9 indicates the saw cylinder, 10 the pod expeller, and 11 the doffer brush, all of these parts being substantially the same as illustrated in the application before mentioned, and not requiring, therefore, further description.

The cylinder 5, the circumferential wall 12 of which is made of sheet metal, is provided on opposite sides with longitudinal recesses 13 extending from end to end thereof. In each of these recesses 13 there is located at suitable intervals throughout the length thereof supports 14, which are secured in place in a manner to be described later, and passing through alining apertures in these various supports, and extending from end to end of the cylinder, is a rod 15. Pivotally mounted on each of these rods is a series of hubs 16, each of which is provided with a plurality of arms 17. In practice each hub contains two of these arms, and each hub projects a given distance beyond the arm at one side thereof so that when the hubs are placed in endwise relation on the rod 15 the space between the arms on adjoining hubs will be the same as the space between two arms on the same hub. In this way all the arms throughout the length of the cylinder are arranged substantially an equal distance apart. In practice the supports 14 are shaped to fit snugly into, and against the respective walls of, the recesses 13, and are provided with an outer curved surface to form a continuation of the outer surface of the cylinder. The outer surface of these supports is channeled, as shown more clearly in Fig. 3 at 18. In practice these supports are secured in position by passing one end 19 of a length of wire 20 into a hole in one of the supports and then wrapping the wire around the cylinder a sufficient number of times to fill up the channels in the opposite supports, then passing the end 21 of the length of wire into another aperture in one of said supports and soldering the said ends in place and likewise soldering the wire either throughout its length or at certain intervals to the cylinder. In this way the shafts 15 are supported at several points throughout their length and are firmly held in position and prevented from being thrown outward by centrifugal force exerted by the relatively heavy metal hubs and arms mounted thereon.

In operation the cotton containing bolls and hulls is fed into the casing 1 and engaged by the feed rolls 2 which act to compress the cotton between them and feed it downward into the machine. The cylinder 5 revolves at a relatively high rate of speed and as the arms 17 pass beneath the column of cotton so fed in by the feed rolls, they operate to "bite" off portions of the cotton from the main body thereof and carry it around and throw it forcibly against the screen 7 and thence over the lower edge of said screen onto the saw cylinder 9. In this operation the pods or hulls passing in with the cotton will be struck by the rapidly revolving arms and broken, and such hull particles will be separated from the cotton in the manner described in the above mentioned application. A certain amount of dirt and fine particles of refuse will pass out through the screen. As previously stated, stones, or other hard substances, passing in with the cotton, will either be broken by the successive contact with the arms 17, or else said arms will yield and pass by or under the object, so that breaking of the arms themselves or of the screen or other part of the machine, which would result if the said arms were in the form of fixed blades, is prevented. Furthermore, the rotating cylinder provided with pivoted arms, not only acts to regulate the amount of cotton fed to the saw cylinder, but it likewise acts to loosen or disintegrate the cotton and place it in the best condition to be engaged by the saws and to permit the hulls to be separated therefrom.

I claim:

1. In a cotton cleaning machine, in combination with mechanism for separating hulls from cotton, means for feeding cotton into the machine in substantially compact form, and a boll-crusher comprising a rotatable cylinder mounted beneath said feeding means and provided at two or more points on its circumference with longitudinal series of independent, pivoted beater-arms, and adapted in operation to deliver the mixed cotton and hulls to the separating mechanism.

2. In a cotton cleaning machine, in combination with mechanism for separating hulls from cotton, means for feeding cotton into the machine in substantially compact form, a boll-crusher comprising a rotatable cylinder mounted beneath said feeding means and provided at two or more points on its circumference with longitudinal series of independent pivoted beater-arms, and adapted in operation to deliver the mixed cotton and hulls to the separating mechanism, and a screen partially surrounding said cylinder.

3. In a cotton cleaning machine, in combination with mechanism for separating hulls from cotton, feeding mechanism comprising a pair of feed rolls and a rotatable pod-crushing cylinder mounted beneath the same having yielding beater-arms, and adapted in operation to deliver the mixed cotton and hulls to the separating mechanism.

4. In a cotton cleaning machine, in combination with the saw cylinder and a pod-expeller coöperating therewith, feeding mechanism comprising a pair of feed rolls revolving toward each other and a rotatable pod-crushing cylinder located beneath said rolls having a plurality of series of independent beater-arms pivotally mounted thereon, and adapted in operation to deliver the mixed cotton and hulls to the saw cylinder.

5. In a cotton cleaning machine, a combined pod crushing and cotton detaching and delivering device comprising a cylinder provided at two or more points around its circumference with longitudinal recesses, a series of supports fixedly secured in said recesses and having alining apertures, rods secured in said supports extending from end to end of the cylinder, and a plurality of hubs pivotally mounted in endwise relation on said rods and having beater-arms projecting therefrom.

In testimony whereof, I have hereunto set my hand in presence of two subscribing witnesses.

DENNIS PARKS.

Witnesses:
BRUCE S. ELLIOTT,
STELLA HILL.